United States Patent [19]
Suzuki et al.

[11] Patent Number: 6,121,342
[45] Date of Patent: Sep. 19, 2000

[54] PHOTOCATIONICALLY CURABLE COMPOSITIONS AND PROCESS FOR PRODUCING THE SAME

[75] Inventors: Hiroshi Suzuki; Akira Sumi; Takenao Yamamura, all of Aichi, Japan

[73] Assignee: Toagosei Co., Ltd., Tokyo, Japan

[21] Appl. No.: 09/226,879

[22] Filed: Jan. 7, 1999

[30] Foreign Application Priority Data

Jan. 13, 1998 [JP] Japan .................................. 10-017946
Mar. 2, 1998 [JP] Japan .................................. 10-067835

[51] Int. Cl.$^7$ .................................. C08J 3/28; C08J 77/14
[52] U.S. Cl. .......................... 522/148; 522/168; 549/215; 528/27; 528/40
[58] Field of Search .............................. 549/215; 528/27, 528/40; 522/148, 168

[56] References Cited

U.S. PATENT DOCUMENTS

| | | | |
|---|---|---|---|
| 3,240,754 | 3/1966 | Plueddemann ........................ | 549/214 |
| 3,338,867 | 8/1967 | Plueddemann ........................ | 260/46.5 |
| 4,367,303 | 1/1983 | Eimers et al. ........................ | 524/107 |
| 4,966,981 | 10/1990 | Takai et al. ........................ | 549/215 |
| 5,463,084 | 10/1995 | Crivello et al. ........................ | 549/214 |

OTHER PUBLICATIONS

Lecamp et al., "Cationic Photocrosslinkable Polydimethylsiloxane III. Synthesis and Photocrosslinking of Polydimethylsiloxane Bearing Oxetane Groups". J.M.S. Pure Appl. Chem., A34(11), pp. 2335–2353, 1997.

"Cationic Photocrosslinkable Polydimethylsiloxane III. Syntheses and Photocrosslinking of Polydimethylsiloxane Bearing Oxetane Groups", Lecamp et al., J.M.S.—Pure Appl. Chem., A349(11), pp. 2335–2353 (1997).

"Synthesis and Photoinitiated Cationic Polymerization of Monomers with the Silsesquioxane Core", Crivello et al., Journal of Polymer Science: Part A: Polymer Chemistry, vol. 35, pp 407–425 (1997).

*Primary Examiner*—Margaret G. Moore
*Attorney, Agent, or Firm*—Heslin & Rothenberg, P.C.

[57] ABSTRACT

A photocationically curable composition and a process for producing the same are provided. The composition comprises, as the essential component, a condensation product having an oxetanyl group, which is a condensation product of a hydrolyzate of an organic silane compound having an oxetanyl group and being represented by the formula below, or of a mixture of said organic silane compound and a reactive silicone having a siloxane linkage-forming group:

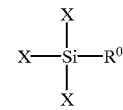

wherein $R^0$ means an organic functional group having an oxetanyl group, and X means a hydrolyzable group. The composition forms cured coating films of high surface hardness, and is useful as hard coating agents.

9 Claims, 6 Drawing Sheets

PHOTOCATIONICALLY CURABLE COMPOSITIONS AND PROCESS FOR PRODUCING THE SAME

BACKGROUND OF THE INVENTION

1. Field of the Invention

This invention relates to a photocationically curable composition and a process for producing the same. The photocationically curable composition according to the present invention has an excellent photo-curability and form a coating film of high hardness, so that it is useful as hard coating agents. It is also useful as a material for pollution-free paints and scribbling-proofing coating agents, photo-molding materials and photo-resist agents, when combinedly used with a silicone.

2. Description of the Prior Art

In the fields of UV-initiated polymerizations and curings, photo-initiated radical polymerizations using multifunctional acrylates and unsaturated polyesters have been extensively investigated and utilized in a commercial scale.

Such radical polymerizations are, however, not free from difficulties in that the polymerization is inhibited by oxygen, for example, in air. Particularly, curing has to be effected under an inert atmosphere in order to effect rapid and complete curing of the composition. When a coating agent composition is cured through a radical polymerization, the thinner thickness of a coating film of the composition is, the greater the polymerization inhibition by oxygen is. On the other hand, photo-initiated cationic polymerization is possible to effect the polymerization even in air, because the polymerization is not inhibited by oxygen, unlike the photo-initiated radical polymerization.

Typical monomers used for the photo-initiated cationic polymerization include epoxides and vinyl ethers. When a composition containing epoxide as the monomer is used, a cured product has an excellent heat resistance, adhesive force and chemical resistance. Particularly, when a composition containing a silicone compound having an epoxide or oxetane group is used as the monomer, a cured product has an excellent heat resistance, chemical resistance and adhesive force, as well as a good pollution-free property. Monomers having an oxetanyl group introduced at the both terminals of a silicone are mentioned in JP 6-16804 A. The present applicant filed a patent application in respect to a process for producing compounds having an oxetanyl group introduced at the both terminals of a silicone (JP Application 9-140984).

Meanwhile, silsesquioxane represented by the formula, $(RSiO_{3/2})_n$, is a generic term of a series of network structured polysiloxanes having a ladder, cage or three-dimensional knitting (random) structure. They are easily handled due to their solubility in usual organic solvents, unlike silica which is an inorganic material. They are featured in that they have excellent processability and formability to coating films.

As for the silsesquioxane compounds having an epoxy group introduced, hydrolyzates of (3-glycidoxy-propyl)trimethoxysilane or 2-(3,4-epoxycyclohexyl)-ethyltrimethoxysilane are mentioned (Chemical Reviews, 1995, Vol. 95, No. 5.).

SUMMARY OF THE INVENTION

Compositions containing an epoxy-type photo-curable monomer are, however, not suitable for the use in which a rapid photo-curability is demanded, particularly as in the case of coating on papers and plastics, because photo-polymerizing rate of the epoxy group is relatively small. Furthermore, cured products from photocationically curable compositions containing a silicone compound having an epoxide or oxetane group as the monomer mentioned above have some problems in their insufficient surface hardness, for example, in case of using as a coating agent, since their basic skeleton structure is generally composed of a silicone or polyether.

It is an object of the invention to provide a photocationically curable composition containing a condensation product, which is deemed silsesquioxane compound, having an oxetanyl group, and which is free from such problems as mentioned above, said compositions giving cured products of high hardness.

It is another object of the invention to provide a photocationically curable resin composition which has a silicone structure, and can form cured products having high hardness and silicone characteristics.

It is the other object of the invention to provide a process for producing photocationically curable compositions, by hydrolyzing and condensing, at a pH condition of not less than 7, an organic silane compound having an oxetanyl group, or a mixture of the organic silane compound and a reactive silicone having a siloxane linkage-forming group.

The present inventors have accomplished the present invention on the basis of the findings that, the condensation product defined below having an oxetanyl group, has an excellent photocationic curability to give a coating film of high hardness after being cured, said compound being a condensation product of a hydrolyzate of an organic silane compound having an oxetanyl group and a hydrolyzable group, or of a mixture of the organic silane compound and a reactive silicone having a siloxane linkage-forming group, and that a photocationically polymerizable condensation product having a silicone chain introduced can form a cured product having the silicone characteristics in addition to the properties as mentioned above.

Accordingly, the present invention relates to a photocationically curable composition comprising, as the essential component, a condensation product having an oxetanyl group which is a condensation product of a hydrolyzate of an organic silane compound having an oxetanyl group and being represented by the formula I shown below, or of a mixture of said organic silane compound with a reactive silicone having a siloxane linkage-forming group:

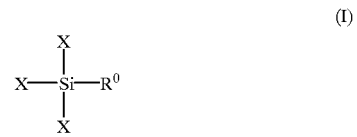

(I)

wherein $R^o$ means an organic functional group having an oxetanyl group, and X means a hydrolyzable group.

The present invention also relates to a process for producing photocationically curable compositions which comprises, hydrolyzing and condensing an organic silane compound having an oxetanyl group and being represented by the formula I as shown above, or a mixture of said silane compound with a reactive silicone having a siloxane linkage-forming group, under a pH condition of not less than 7.

BRIEF DESCRIPTION OF THE DRAWINGS

In the accompanying drawings.

DESCRIPTION OF THE PREFFERD EMBODIMENTS

Figure 1:
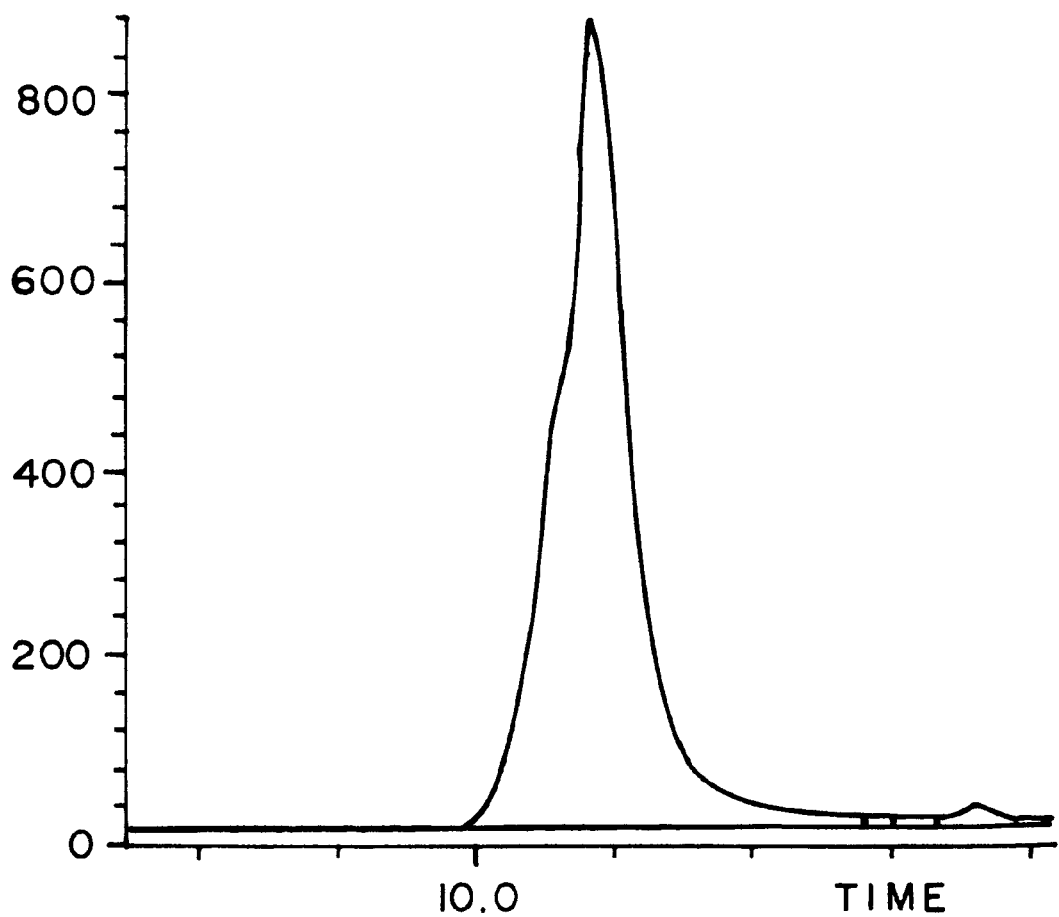
FIG. 1 shows a GPC chart of photocationically curable composition A-1 prepared according to Synthesis No.1 in Example 1.

The invention will more fully be described hereunder.

In the present specification, "compounds having an oxetanyl group" may be referred to as "oxetane compounds".

The photocationically curable composition according to the invention comprises, as the essential component, a condensation product having an oxetanyl group, which is a condensation product of a hydrolyzate of an organic silane compound having an oxetanyl group and being represented by the formula I as shown above, or of a mixture of said organic silane compound and a reactive silicone having a siloxane linkage-forming group.

1) organic silane compounds

The organic silane compounds used in the present invention are represented by the formula I as shown above. In the formula I, $R^0$ is any organic functional group containing at least one oxetanyl group, but, preferably, it is a group represented by the following formula IV:

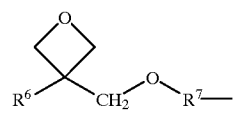
(IV)

wherein $R^6$ means a hydrogen atom or an alkyl group having 1 to 6 carbon atoms, and $R^7$ means an alkylene group having 2 to 6 carbon atoms.

In the formula IV, preference is that $R^6$ is an ethyl group among a hydrogen atom or an alkyl group having 1 to 6 carbon atoms, and $R^7$ is a propylene group among an alkylene group having 2 to 6 carbon atoms, taking into account of easiness of availability or synthesis. When the present compositions are used as a photocationically curable coating agent, such compounds having $R^6$ or $R^7$ of not less than 7 carbon atoms are not desirable, because hardness of coating films formed from the composition is readily decreased.

Some part, 5–80%, of $R^0$ may be exchanged from any orgainc functional group containing at least one oxetanyl group to a fluoroalkyl group, and it gives more useful compositions.

In the above formula I, X is not specifically limited so far as it is a group having a hydrolyzable group, but alkoxy, cycloalkoxy and aryloxy groups are preferable. In the compound containing three Xs in a molecule, they may be all the same ones, or two or more different from each other. As for the other hydrolyzable groups, there may be mentioned a halogen atom. However, the hydrolysis gives a hydrogen halide which tends to turn the reaction system to an acidic condition until a possible ring-opening reaction of the oxetanyl group occurs.

The alkoxy group mentioned above includes, for example, methoxy, ethoxy, n- and i-propoxy, and n-, i- and t-butoxy groups. The cycloalkxy group includes a cyclohexyloxy group, and the aryloxy group includes a phenyloxy group. An alkoxy group having 1 to 3 carbon atoms is preferable, because of ready hydrolyzability of the alkoxy group. The most preferable X is an ethoxy group, because its material is readily available and the hydrolysis and condensation reaction in the condensation product-forming step is easily controlled.

The organic silane compounds may be obtained, for example, by adding an oxetane compound having an alkenyl terminal to a compound represented by the formula V as shown below. The terms, "an oxetane compound having an alkenyl terminal", mean that the oxetane compound has a terminal group selected from vinyl, ally, ethynyl, propargyl and isopropenyl groups. An allyl terminal is preferable, because a material for synthesis is easily available and the synthesis is easy. In addition, a hydrosilylation reaction mentioned below is easily conducted in case of the allyl terminal.

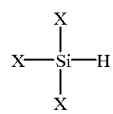
(V)

wherein X in the formula has the same meaning as X in the formula I mentioned above.

The addition reaction of an oxetane compound to a compound represented by the formula v is a hydroxysilylation reaction of the Si—H group in the formula V compound with an alkenyl terminal of the oxetane compound. The reaction proceeds in the presence of a catalyst of the VIII group metal. The VIII group metal catalysts include a simple metal such as cobalt, nickel, ruthenium, rhodium, palladium, iridium and platinum, and organic metal complexes, metal salts, metal oxides thereof, etc. Preferences are metallic platinum, organic metal complex, salt and oxide thereof, because of their high catalytic activity, easy handlings, and relatively not expensive costs. The organic platinum complexs are the most preferred. The catalyst is preferably used in an amount of 1 to 1,000 ppm by weight, on the basis the total amount of the formula V compound and the oxetane compound.

The other reaction conditions in the hydroxysilylation reaction are not specifically limited, but the preferable reaction temperature is 20 to 100° C. and the preferable reaction period of time is 2 to 10 hours.

(2) Reactive silicones

Reactive silcones used in the invention are not specifically limited, so far as they are compounds having one or more siloxane linkage-forming groups in a molecule. The reactive silicones are preferably straight-chained or branched linear silicones. The siloxane linkage-forming groups may be present in a side chain or at the terminal. The term, "siloxane linkage-forming group", means a group which can form a siloxane linkage against the silicon atoms in the organic silane compound, in the course of the hydrolysis reaction. For example, a hydrogen atom, a hydroxy, alkoxy, cycloalkoxy and aryloxy groups, and a halogen atom, may be mentioned.

Reactive silicones used in the present invention are preferably at least one selected from the compounds represented by the formulae II and III as shown below:

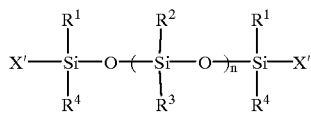

(II)

wherein X' means a siloxane linkage-forming group; $R^1$ and $R^4$ mean, respectively, a substituting group selected from alkoxy, cycloalkoxy, aryloxy, alkyl, cycloalkyl and aryl groups; $R^2$ and $R^3$ mean, respectively, an akyl, cycloalkyl or aryl group; and n is a positive number of 1 to 10,000; and

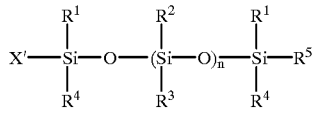

(III)

wherein X', $R^1$, $R^2$, $R^3$, $R^4$ and n are the same as defined above, and $R^5$ means an alkyl, cycloalkyl or aryl group.

In these formulae, two $R^1$s contained in a single molecule of the II or III compound may be of the same, or different from each other. It is the same with $R^4$. $R^2$ and $R^3$ may be the same or different from each other. Furthermore, n $R^2$s in a single molecule may be the same or different from each other. It is the same with $R^3$.

The alkyl group in the reactive silicone includes methyl, ethyl, n- and i-propyl, and n-, i- and t-butyl groups. There may be exemplified a cyclohexyl group, as for the cycloalkyl group, and a phenyl group, as for the aryl group. As for the alkoxy, cycloalkoxy and aryloxy groups, there may be exemplified the same groups as mentioned in the above explanation of the organic silane compound.

When $R^1$ and $R^4$ are, each, an alkoxy, cycloalkoxy or aryloxy group, these groups work as a siloxane linkage-forming group, so that the reactive silicone and the condensation product may form a stronger linkage. This is an advantage in that bleeding of the unaltered reactive silicone in cured products is certainly prevented. Particularly, a case where $R^1$ and $R^4$ are, each, methoxy, ethoxy, n-propoxy or i-propoxy group, is preferable, since their hydrolyzabilities are large. Furthermore, a case where $R^1$ and $R^4$ are, each, an alkyl, cycloalkyl or aryl group, is advantageous, too, since the reactive silicone is not expensive and easily available in the market.

Each of $R^2$ and $R^3$ is preferably a methyl or ethyl group, more preferably, both $R^2$ and $R^3$ being a methyl group, because such reactive silicones are not expensive, easily available in the market, and readily give so-called silicone characteristics such as peeling, surface lubrication, and water- and oil-repellencies.

$R^5$ in the formula III compounds is preferably an alkyl group, from a viewpoint of the manufacture. Preferences are methyl, ethyl, n- and i-propyl, and n-, i- and t-butyl.

In the II and III formula compounds, n is a positive number of 1 to 10,000. When n is higher than 10,000, handling of the reactive silicones becomes difficult, because of their high viscosity. Further, the reactive silicones are hardly introduced to a condensation product. Suffix n is preferably a positive number of 10 to 100. Within such a range, a significantly high viscosity can be avoided, while keeping practically sufficient reactivity. Furthermore, the cured product performs excellent silicone characteristics, because of a fully long silicone chain.

In the above formula II compound and III compound, the siloxane linkage-forming group, X', is preferably a hydrogen atom, or a hydroxy, alkoxy, cycloalkoxy or aryloxy group. When X' is a halogen atom, a hydrogen halide formed by the hydrolysis tends to turn the reaction system to an acidic condition until a possible ring-opening reaction of the oxetanyl group occurs.

Mixing ratio of the organic silane compound and the reactive silicone for the hydrolysis is preferably 1 to 100 parts by weight, more preferably 5 to 50 parts by weight, of the reactive silicone, on the basis of 100 parts by weight of the organic silane compound. When an amount of the reactive silicone used is smaller than 1 part by weight, not enough silicone characteristics is sometimes performed in cured products. When an amount of the reactive silicone used is larger than 100 parts by weight, there is a possibility to cause decrease in curability of the composition, decrease in hardness of cured products, and bleeding due to unaltered reactive silicone.

(3) Hydrolysis and condensation reaction

The photocationically curable composition according to the invention comprises a condensation product of a hydrolyzed product obtained by a hydrolysis (simply referred to as "hydrolyzate", hereunder) of an organic silane compound as mentioned above, or of a mixture of said organic silane compound and a reactive silicone. The hydrolysis and condensation reaction is preferably conducted at a pH condition of not less than 7, more preferably at a pH condition of 9 to 13. If the reaction is conducted under an acidic condition, the oxetanyl ring tends to open, possibly forming a gel, and also consumption of the oxetanyl group tends to deccrease curability of the composition. When pH is less than 9, rate of the hydrolysis and a condensation reaction of the silicon compound is not so large that productivity of the present composition decreases. When pH is more than 13, the reaction is not economical, since a large amount of an alkaline agent is needed in order to increase the pH, and a troublesome process for removal of the alkaline agent from the reaction system is necessary.

The pH condition of not less than 7 of the reaction system is usually controlled by adding an alkaline agent to the system. The alkaline agents to be used include ammonia, quaternary ammonium salts and organic amines, preferably quaternary ammonium salts, because of their high activity as a basic catalyst.

The other conditions for the reaction are not specifically limited, but the reaction is preferably conducted at a temperature within the range of 10 to 120° C., more preferably 20 to 80° C., for 2 to 30 hours, more preferably 4 to 24 hours.

The reaction is usually conducted in the presence of an organic solvent. Any organic solvent is used, so far as the reaction system is kept at a uniform solution. For example, alcohols such as methyl alcohol, ethyl alcohol, isopropyl alcohol and the like; ketones such as acetone, methyl ethyl ketone and the like; tetrahydrofuran, toluene, 1,4-dioxane, hexane, or ligroin may be used.

The photocationically curable compositions according to the invention may contain a silsesquioxane compound of any structure, such as ladder, cage and random forms, so far as it is formed by the hydrolysis and condensation as mentioned above. They may contain a single kind of the silsesquioxane compounds, or two or more kinds of the silsesquioxane compounds having different structures or molecular weights from each other. In the silsesquioxane compounds produced by the reaction, preferably not less than 90%, more preferably substantially all, of the hydrolyzable group in the organic silane compound is condensed. When more than 10% of the hydrolyzable group is left unaltered, not enough silsesquioxane structure may be formed, until hardness of coating films formed is often decreased, or storage stability of the compositions is often decreased. The fact that substantially all of the hydrolyzable group has been condensed is confirmed by an NMR chart of the condensation product obtained where no peak based on the hydrolyzable group is observed.

When no reactive silicone is used, the condensation product contained in the photocationically curable compositions according to the invention has a number average molecular weight preferably within the range of 600 to 5,000, more preferably the range of 1,000 to 3,000. If the number average molecular weight is smaller than 600, a sufficient hardness of a coating film formed by the composition is sometimes hardly obtained. In addition, viscosity of the obtained composition is so small that cissing tends to occur on a pained surface when such a composition is used as a coating agent. If the number average molecular weight is larger than 5,000, viscosity of the obtained composition increases too large, so that handling of the formed composition becomes very hard. Furthermore, coating property is inferior when such composition is used as a coating agent. When the present composition is used as a coating agent, ratio of the condensation product having a number average molecular weight within the range of 1,000 to 3,000 is preferably not less than 50% by weight, more preferably not less than 70% by weight, on the basis of the total amount of the condensation product contained in the composition. Number average molecular weight referred to in the present specification is that calculated in terms of polystyrene, according to gel permeation chromatography (GPC).

(4) Reactive diluents

The photocationically curable composition according to the present invention may contain a photocationically polymerizable reactive diluent (simply referred to as "reactive diluent", hereinafter) in order to decrease viscosity of the composition, or to control physical properties of cured products. Such reactive diluents include one or more compounds selected from those having a photocationically polymerizable group such as vinyloxy, epoxy and oxetanyl groups. Specifically, the reactive diluents include those having a vinyloxy group such as ethyl vinyl ether; those having an epoxy group such as bisphenol F diglycidyl ether; and those having oxetanyl group such as 1,4-bis[(3-ethyl-3-oxetanylmethoxy)methyl]-benzene, 3-ethyl-3-(allyloxymethyl)oxetane, 3-ethyl-3-(hexyloxymethyl)oxetane and [3-(triethoxysilyl)propyl-oxymethyl]oxetane. Among these diluents, epoxide and oxetane compounds are preferable, since they give cured products having excellent heat resistance, adhesion and chemical resistance. Oxetane compounds are more preferable, because they usually have a larger photopolymelizing rate and give a larger polymerization degree, than epoxides compounds.

When reactive diluents are used, an amount thereof varies depending on conditions of each components and usage of the present compositions. In case where the condensation product has no silicone chain, weight ratio of the condensation product to the reactive diluent is preferably within the range from 5/95 to 95/5, more preferably within the range from 10/90 to 90/10. If an amount of either of the components is less than 5% by weight, not enough effect of the component added is often expected. When the condensation product has a silicone chain, preferably not more than 5,000 parts by weight, more preferably 5 to 3,000 parts by weight, particularly preferably 10 to 2,000 parts by weight, of the diluent is used, on the basis of 100 parts by weight of the condnesation product. If an amount of the reactive diluent is larger than 5,000 parts by weight, the silicone characteristics are not performed in cured products, because a ratio of the silicone chain in the composition becomes small.

(5) Other components

The photocationically curable compositions according to the invention may contain cationic photopolymerization-initiators conventionally used. For example, diallyliodonium salt or triallylphosphonium salt is preferably used. An amount of such photopolymerization-initiators is usually within the range from 1 to 10% by weight, more preferably within the range of 3 to 5% by weight, on the basis of the total amount of a non-evaporizable matter in the hydrolyzate and the reactive diluent.

The photocationically curable compositions of the invention may further contain any of other additives such as viscosity-controlling agents, leveling agents, stabilizers, silane-coupling agents, etc.

The present composition may contain organic solvents, which are not more than 50% by weight, more preferably not more than 20% by weight, particularly preferably not more than 10% by weight, on the basis of the total amount of the composition.

The composition according to the present invention can provide a cured product of high surface hardness, owing to the silsesquioxane skeleton structure of the compound as mentioned above. Furthermore, the present composition is a kind of oxetane-type photocurable resin compositions which can be rapidly and completely polymerized even in air. The composition containing a condensation product partially having a silicone chain introduced can give the silicone characteristics to cured products. Accordignly, the compositions according to the invention are useful as, for example, pollution-free paints and scribbling-proofing coating materials, and, further, available as protection-coating materials, resin-reformers, resist materials, photo-molding agents, etc.

The present invention will be explained in detail with reference to the following examples.

EXAMPLE 1

A composition containing a condensation product was synthesized by hydrolyzing, as shown below, a silicon compound, (referred to as "Oxe-Tries", hereunder), which is represented by the formula VI and may be an addition reaction product from 3-ethyl-3-allyloxymethyloxetane and triethoxysilane;

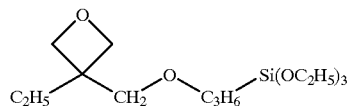

(VI)

(1) Syntheses of compositions containing a condensation product

Synthesis No. 1

(i) Into a reactor provided with a stirrer, thermometer and cooler were fed 12.37 g (38.6 mmol) of Oxe-Tries, 1.05 g of an aqueous 10% solution of tetramethyl-ammonium hydroxide, which may be referred to as "$Me_4NOH$", hereunder, ($H_2O$: 52.5 mmol, $Me_4NOH$: 1.2 mmol), 1.14 g (63.3 mmol) of water and 300 ml of 1,4-dioxane, a solvent. The mixture was refluxed for 16 hours under heating and stirring. The reaction system at the end of reaction had a pH of 12.1.

(ii) From the reaction mixture was evaporated 200 ml of the solvent, and then the concentrated reaction system was allowed to proceed for additional 6 hours.

(iii) After the reaction was over, the solvent and other matters were distilled off in vacuo, and then the solvent was replaced by 200 ml of toluene.

(iv) The reaction mixture was washed with water several times in a fractionating funnel, and dehydrated over anhydrous sodium sulfate, followed by evaporation of the toluene in vacuo to obtain Composition A-1.

Resulting Composition A-1 was highly viscous, and soluble in toluene, tetrahydrofuran, hexane, acetone, and other solvents in any ratio.

Composition A-1 was subjected to a GPC measurement under the following conditions:

[Measuring conditions]

Apparatus: HLC-802A (manufactured by Toso Co. Ltd.)

Column: TSK-GEL, 2500 HXL+1000 HXL

Eluent: tetrahydrofuran (flow rate, 1.0 ml/min)

Detector: RI

As seen in FIG. 1, the resulting GPC chart shows an almost single peak, though a slight shoulder is observed at the higher molecular weight side. Molecular weight of Composition A-1 obtained from the GPC measurement is as follows:

Number average molecular weight (Mn): 1,870

Weight average molecular weight (Mw): 2,450

Distribution degree (Mn/Mw): 1.31

This single peak is assumed to be a cage structure silsesquioxane, which is an octomer (T8) of Oxe-Tries. The shoulder at the higher molecular weight side is assumed to be a silsesquioxane with a random, ladder or decamer or higher cage structure, or a mixture thereof.

Figure 2:
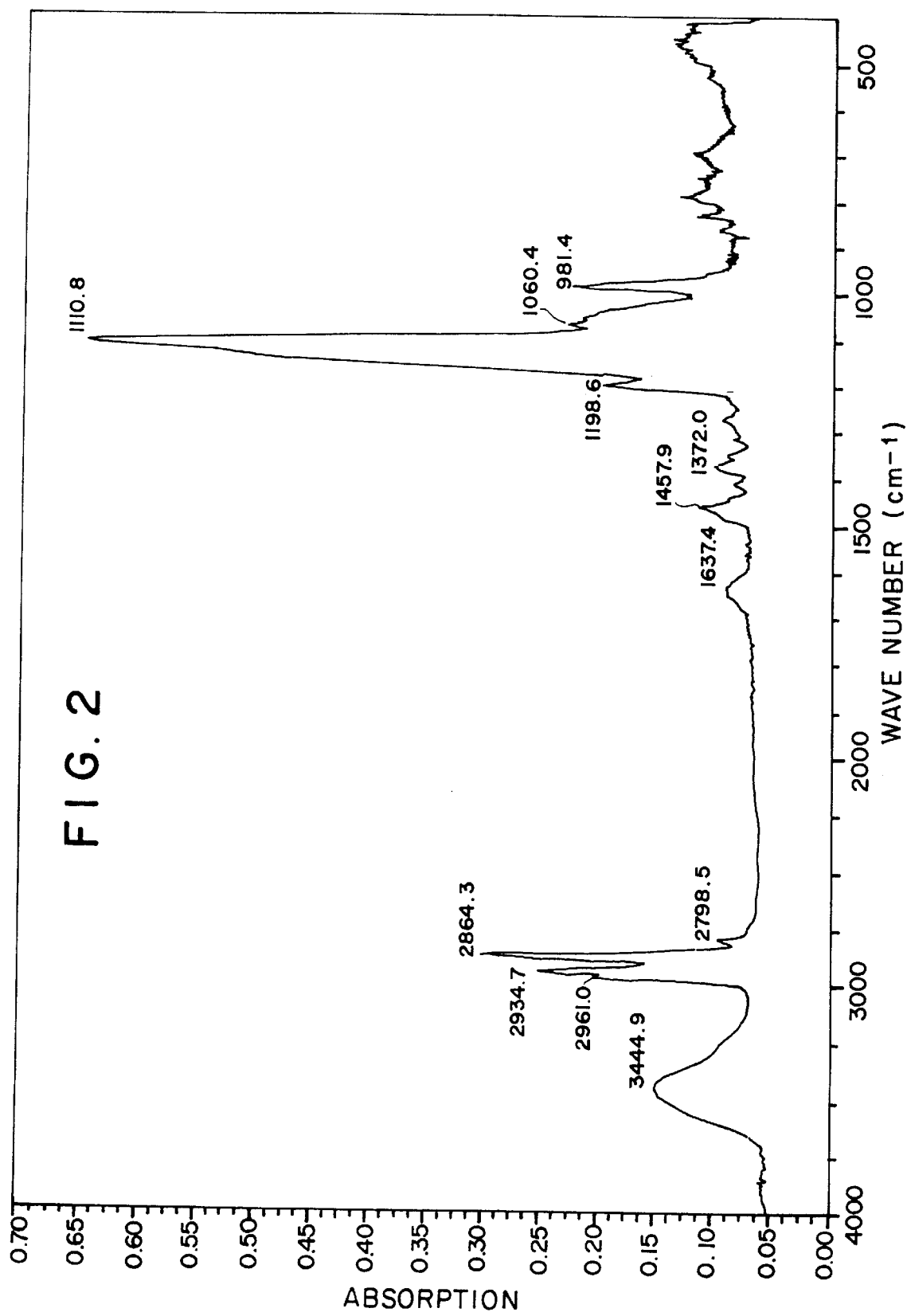
FIG. 2 shows an IR chart of photocationically curable composition A-1 prepared according to Synthesis No.1 in Example 1.

In FIG. 2, an IR chart of Composition A-1 is shown, in which an absorption at 981.4 $cm^{-1}$ corresponding to a cyclic ether linkage shows that Composition A-1 contains a compound having an oxetanyl group. An absorption at 1110.8 $cm^{-1}$ corresponds to Si—O—Si and $CH_2$—O—$CH_2$ linkages.

Figure 3:
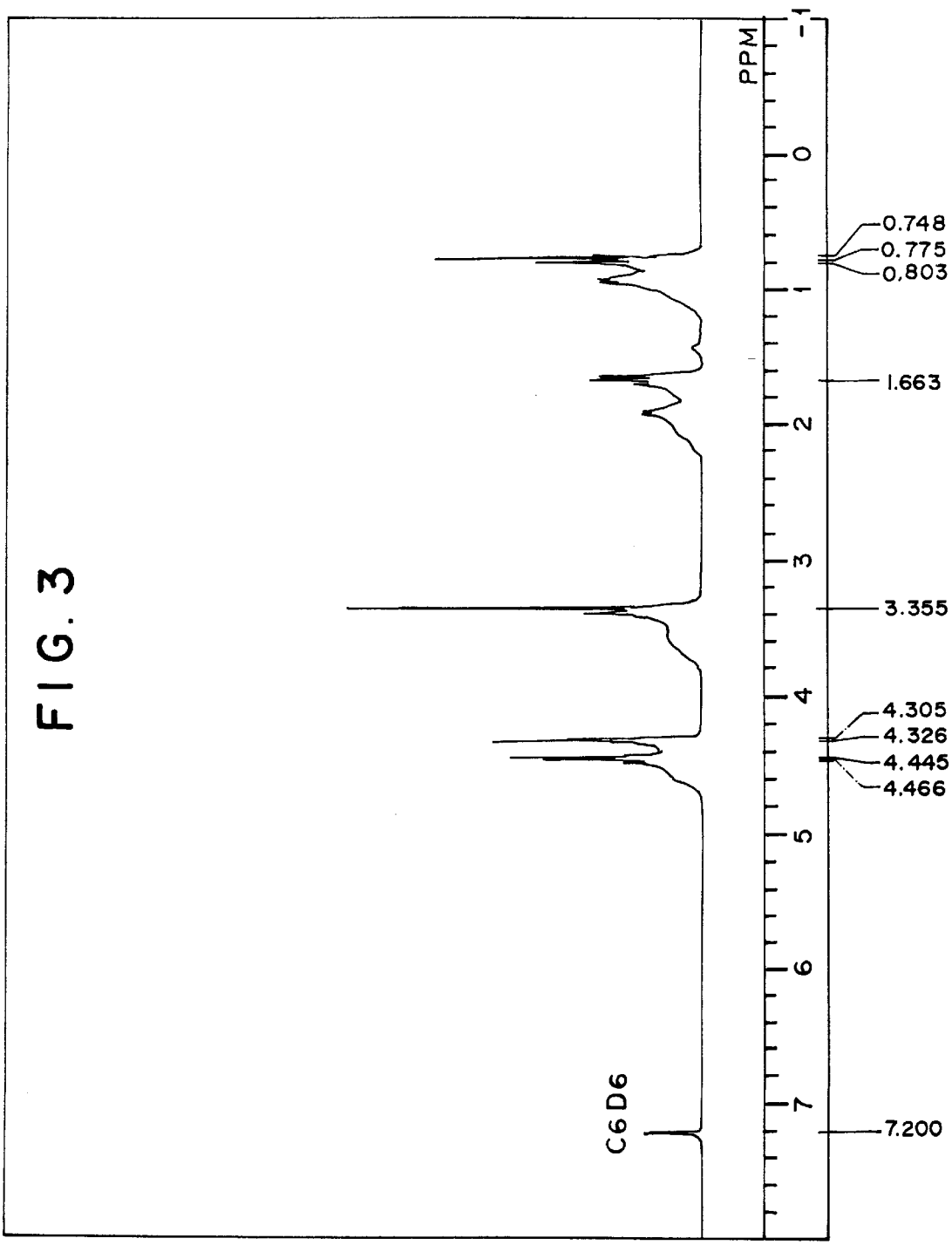
FIG. 3 shows an $^1$H-HMR chart of photocationically curable composition A-1 prepared according to Synthesis No.1 in Example 1.
Figure 4:
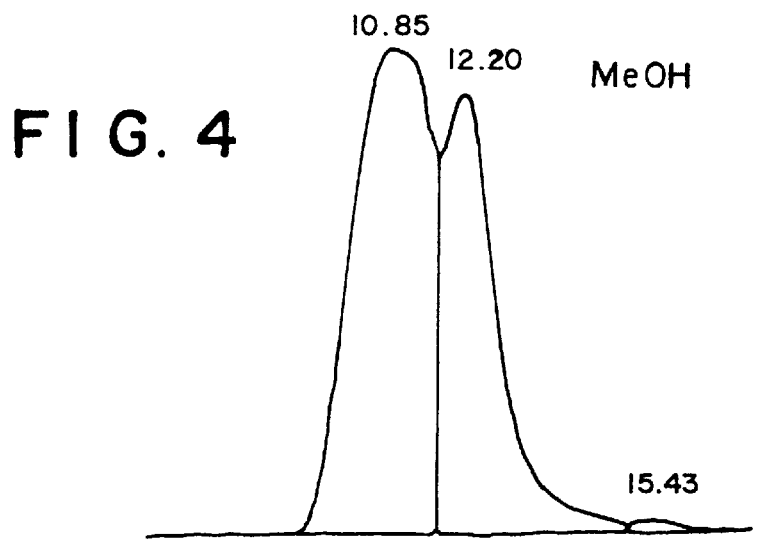
FIG. 4 shows a GPC chart of photocationically curable composition A-2 prepared according to Synthesis No.2 in Example 1.
Figure 5:
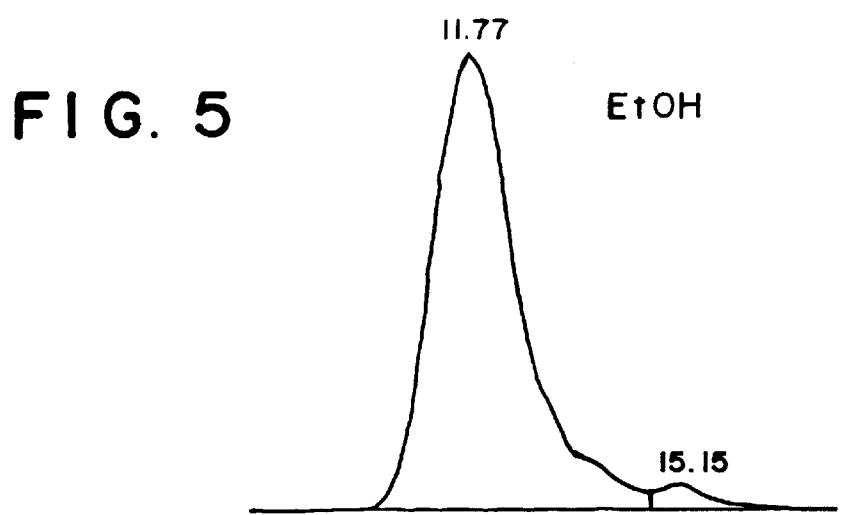
FIG. 5 shows a GPC chart of photocationically curable composition A-3 prepared according to Synthesis No.3 in Example 1.
Figure 6:
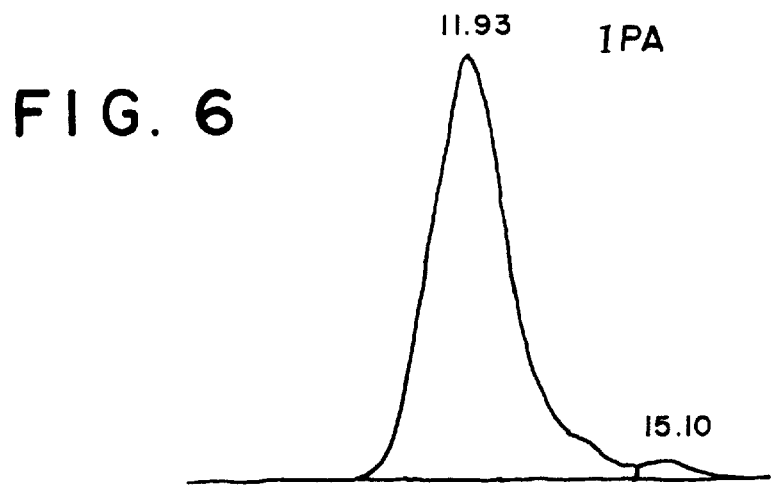
FIG. 6 shows a GPC chart of photocationically curable composition A-4 prepared according to Synthesis No.4 in Example 1.
Figure 7:
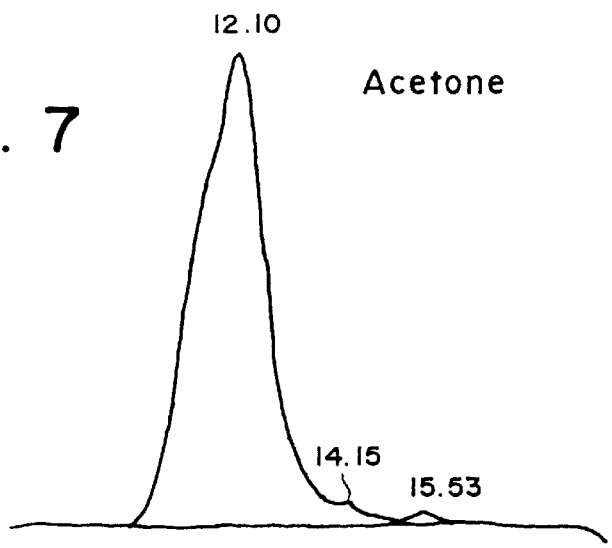
FIG. 7 shows a GPC chart of photocationically curable composition A-5 prepared according to Synthesis No.5 in Example 1.
Figure 8:
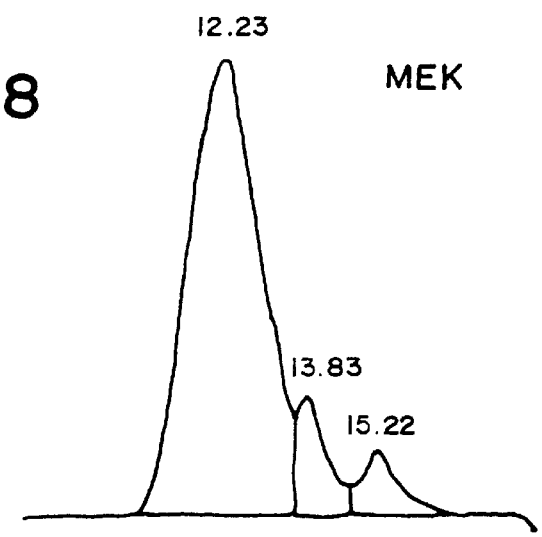
FIG. 8 shows a GPC chart of photocationically curable composition A-6 prepared according to Synthesis No.6 in Example 1.
Figure 9:
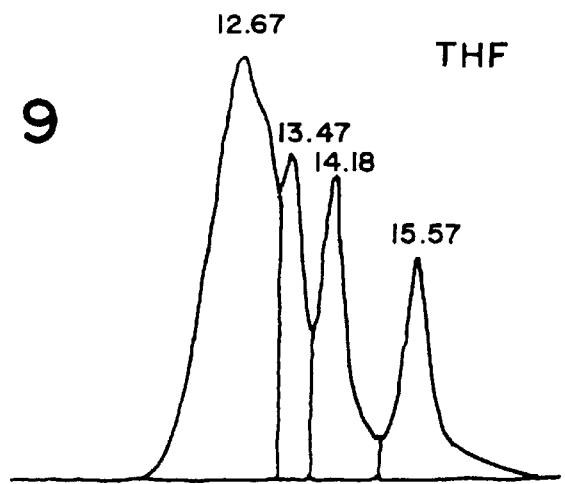
FIG. 9 shows a GPC chart of photocationically curable composition A-7 prepared according to Synthesis No.7 in Example 1.
Figure 10:
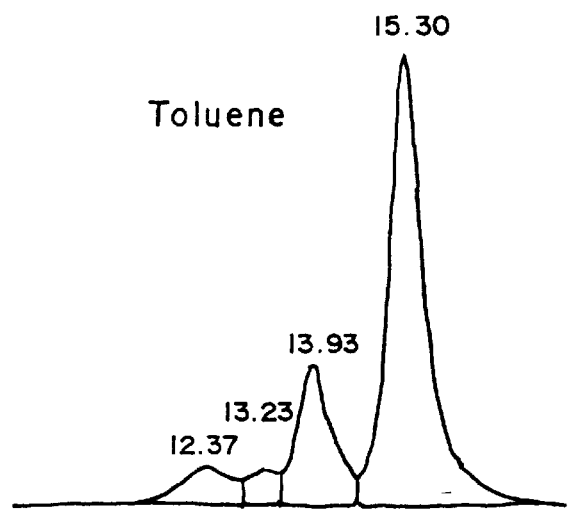
FIG. 10 shows a GPC chart of photocationically curable composition A-8 prepared according to Synthesis No.8 in Example 1.

In FIG. 3, an $^1$H-NMR chart of Composition A-1 is shown, in which peaks at 4.3 to 4.5 ppm exhibit hydrogen atoms of $CH_2$ of oxetane ring. The fact that no peak corresponding to hydrogen atoms of ethoxy group (Si—O—$C_2H_5$) is observed in the NMR chart, shows that the hydrolysis reaction has proceeded well and substantially all of the hydrolyzable groups in Oxe-Tries are assumed to have been condensed.

The fact that broad and sharp peaks are concurrently observed in the NMR chart shows that Composition A-1 is a mixture of silsesquioxane compounds having each different structures. Among these peaks, sharp peaks may be from a cage structure silsesquioxane compounds, and broad peaks may be from a ladder or random structure silsesquioxane compounds.

Syntheses Nos. 2 through 8

Into a reactor were fed 4.12 g (12.9 mmol) of Oxe-Tries, 0.35 g of an aqueous 10% $Me_4NOH$ solution ($H_2O$: 17.5 mmol, $Me_4NOH$: 0.4 mmol), 0.38 g (21.1 mmol) of water and 100 ml of a solvent as listed in Table 1. The mixture was stirred for 24 hours at room temperatures to proceed with the reaction. Each reaction system showed a pH value within the range from 11.8 to 12.5, at the end of the reaction.

After the reaction is over, the reaction mass was treated in the same way as in Synthesis No. 1, to obtain Compositions A-2 through A-8.

These Compositions were subjected to GPC measurements as for Composition A-1. Resulting GPC charts are shown in FIGS. 4 through 10. Molecular weights obtained from the GPC measurements, as well as appearances of the compositions, are also shown in Table 1, in which MeOH, EtOH, IPA, MEK and THF mean, respectively, methyl alcohol, ethyl alcohol, isopropyl alcohol, methyl and ethyl ketone and tetrahydrofuran. Peak 5 shows residual Oxe-Tries.

TABLE 1

| Syntheses | No. 2 | No. 3 | No. 4 | No. 5 | No. 6 | No. 7 | No. 8 |
|---|---|---|---|---|---|---|---|
| Compositions | A-2 | A-3 | A-4 | A-5 | A-6 | A-7 | A-8 |
| Solvents | MeOH | EtOH | IPA | acetone | MEK | THF | toluene |
| Peak 1 | | | | | | | |
| Peak top | 10.85 | | | | | | |
| Mn | 4,350 | | | | | | |
| Mw/Mn | 1.30 | | | | | | |
| Peak area (%) | 61.75 | | | | | | |
| Peak 2 | | | | | | | |
| Peak top | 12.20 | 11.77 | 11.93 | 12.10 | 12.23 | 12.67 | 12.37 |
| Mn | 1,370 | 1,720 | 1,680 | 1,730 | 1,500 | 1,260 | 1,500 |

TABLE 1-continued

| Syntheses | No. 2 | No. 3 | No. 4 | No. 5 | No. 6 | No. 7 | No. 8 |
|---|---|---|---|---|---|---|---|
| Mw/Mn | 1.09 | 1.32 | 1.29 | 1.23 | 1.19 | 1.08 | 1.07 |
| Peak area (%) | 36.89 | 96.90 | 97.23 | 96.07 | 84.09 | 51.57 | 8.07 |
| Peak 3 | | | | | | | |
| Peak top | | | | | | 13.47 | 13.23 |
| Mn | | | | | | 790 | 920 |
| Mw/Mn | | | | | | 1.00 | 1.01 |
| Peak area (%) | | | | | | 14.91 | 4.09 |
| Peak 4 | | | | | | | |
| Peak top | | | | 14.15 | 13.83 | 14.18 | 13.93 |
| Mn | | | | 560 | 650 | 590 | 650 |
| Mw/Mn | | | | 1.01 | 1.01 | 1.01 | 1.01 |
| Peak area (%) | | | | 2.10 | 9.32 | 18.15 | 19.77 |
| Peak 5 | | | | | | | |
| Peak top | 15.43 | 15.15 | 15.10 | 15.53 | 15.22 | 15.57 | 15.30 |
| Mn | 380 | 370 | 370 | 330 | 360 | 320 | 360 |
| Mw/Mn | 1.02 | 1.05 | 1.05 | 1.05 | 1.05 | 1.06 | 1.04 |
| Peak area (%) | 1.37 | 2.77 | 1.83 | 1.83 | 6.59 | 15.37 | 68.08 |
| Appearances | colorless clear | colorless clear | colorless clear | brown | brown | orange | pale yellow |

Table 1 shows that Synthesis No. 2 in which methyl alcohol is used as the solvent shows double peaks in the GPC chart which means that a large amount of compounds having higher molecular weights is formed, as compared with that in Synthesis No. 1. In Syntheses Nos. 3 through 6, the compounds contained in each composition are of the same degree. When alcohols are used as the solvent, the compositions tend to be less colored, as compared with the cases of using ketones, supposedly because $Me_4NOH$ is stable in alcohols.

In Synthesis No. 7 in which tetrahydrofuran is used, and in Synthesis 8 in which toluene is used, there are a considerable amount of unaltered Oxe-Tries. This would be due to that $Me_4NOH$ is hardly soluble in tetrahydrofuran, and toluene is not soluble in water.

Synthesis No. 9

Synthesis No. 2 was repeated except that the hydrolysis was allowed to proceed at a refluxing temperature in place of room temperatures, to obtain Composition A-9. That is, a mixture of 38.6 mmol of Oxe-Tries, 1.2 mmol of $Me_4NOH$, 115.8 mmol of water and 300 ml of methyl alcohol was stirred in a reactor for 24 hours at a refluxing temperature. The reaction mass was treated in the same manner as in Synthesis No. 1, to obtain Composition A-9. The reaction system at the end of the reaction showed pH 12.0.

Figure 11:
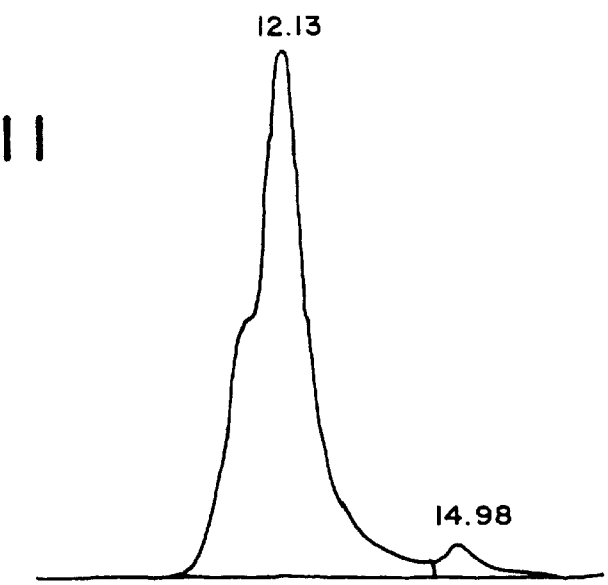
FIG. 11 shows a GPC chart of photocationically curable composition A-9 prepared according to Synthesis No.9 in Example 1.

A GPC chart of Composition A-9 is shown in FIG. 11. Molecular weights obtained from the GPC measurement are shown in Table 2.

Synthesis No. 10

Synthesis No. 9 was repeated, except that a concentration of Oxe-Tries in the hydrolysis was increased. That is, a mixture of 193.0 mmol of Oxe-Tries, 6.0 mmol of $Me_4NOH$, 579.0 mmol of water and 300 ml of methyl alcohol was stirred in a reactor for 24 hours at a refluxing temperature to proceed with a reaction. The reaction mixture was treated in the same manner as in Synthesis No.1, to obtain Composition A-10. The reaction system at the end of the reaction showed pH 12.0.

A GPC chart of the Composition A-10 is shown in FIG. 11. Molecular weight obtained from the GPC measurement is shown in Table 2.

TABLE 2

| Syntheses | No. 2 | No. 9 | No. 10 |
|---|---|---|---|
| Compositions | A-2 | A-9 | A-10 |
| Reaction conditions | | | |
| Reaction temp. | room temp. | reflux temp. | reflux temp. |
| Oxe-TRIES concentration | lower | lower | higher |
| Peak 1 | | | |
| Peak top | 10.8 | | |
| Mn | 4,350 | | |
| Mw/Mn | 1.30 | | |
| Peak area (%) | 61.75 | | |
| Peak 2 | | | |
| Peak top | 12.20 | 12.13 | 11.57 |
| Mn | 1,370 | 1,570 | 1,900 |
| Mw/Mn | 1.09 | 1.20 | 1.39 |
| Peak area (%) | 36.89 | 95.90 | 100.00 |
| Peak 3 | | | |
| Peak top | 15.43 | 14.98 | |
| Mn | 380 | 390 | |
| Mw/Mn | 1.02 | 1.05 | |
| Peak area (%) | 1.37 | 4.10 | |

Figure 12:
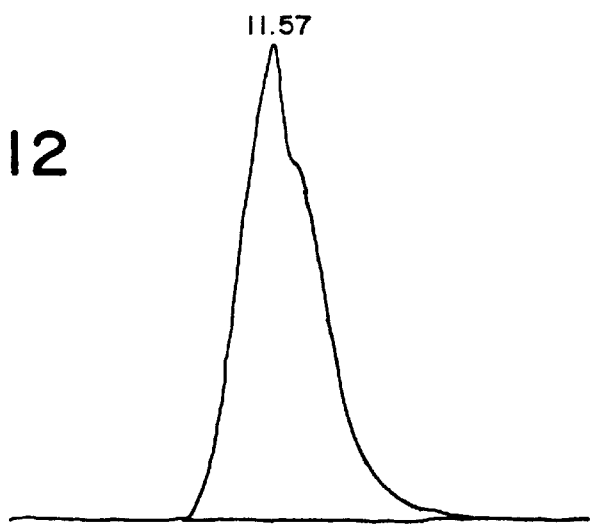
FIG. 12 shows a GPC chart of photocationically curable composition A-10 prepared according to Synthesis No.10 in Example 1.

FIGS. 3, 11 and 12 and Table 2 show that lower reaction temperatures tend to produce larger amounts of lower molecular weight compounds, supposedly because a depolymerization reaction is suppressed at lower temperatures. Furthermore, higher Oxe-Tries concentrations tend to increase molecular weight, supposedly because it facilitates occurence of a condensation reaction, thus readily forming silsesquioxane compounds of ladder and random structures.

(2) Evaluation of the photocationically curable compositions

Each of photocationically curable Compositions A-1 through A-10 each obtained in Syntheses 1 through 10 was dissolved in a small amount of hexane. To each solution was added 2.5% by weight of a cationic photo-initiator on the basis of the weight of the composition. The mixture was applied onto a glass substrate with a bar coater. After the solvent was evaporated, the mixture was irradiated with UV. Compositions all exhibited excellent photocationic curabilities.

[UV irradiation conditions]

Lamp: 80 W/cm high pressure mercury lamp

Hight of a lamp: 10 cm

Conveyer speed: 10 m/min

Radiation atmosphere: in air

Passing times: 5 times

Initiator: bis(dodecylphenyl)iodonium hexafluoroantimonate (2.5% by weight)

Cured film formed from the composition in Synthesis No. 1 was tested in respect to pencil hardness of the surface according to JIS K 5400. As the results, the coating film was found to be of high hardness, with a flawing of 5H and peeling of not less than 9H.

EXAMPLES 2 THROUGH 6 AND COMPARATIVE EXAMPLES 1 AND 2

(1) Synthesis of a composition containing a silsesquioxane compound

Synthesis No. 11

(i) Into a reactor provided with a stirrer and thermometer were fed 30 ml of isopropyl alcohol, 0.91 g of an aqueous 10% $Me_4NOH$ solution ($H_2O$: 45.6 mmol, $Me_4NOH$: 1.0 mmol) and 2.42 g (134.4 mmol) of water. Then, 19.23 g (60.0 mmol) of Oxe-Tries was slowly added thereto. The mixture was left to stand for 24 hours under stirring at room temperatures. At the end of the reaction, the system showed pH 11.5.

(ii) After the reaction was over, 100 ml of toluene was added to the reaction mass, and the solution was washed with a saturated sodium chloride solution using a fractionating funnel.

(iii) The washing was repeated until the aqueous layer in the fractionating funnel became neutral. Then, the organic layer was fractionated and dehydrated over anhydrous sodium sulfate. Evaporation of the toluene gave the objective condensation product (silsesquioxane) B, which had a number average molecular weight of 1,800.

Synthesis No. 12

According to the procedure as mentioned below, γ-glycidoxy-propyltriethoxysilane (referred to as "Epx-Tries", hereunder) was hydrolyzed to obtain condensation product (silsesquioxane) C.

(i) Into a reactor provided with a stirrer and thermometer, were fed 30 ml of isopropyl alcohol, 0.91 g of an aqueous 10% $Me_4NOH$ solution ($H_2O$: 45.6 mmol, $Me_4NOH$ 1.0 mmol) and 2.42 g (134.4 mmol) of water. Then, 16.70 g (60.0 mmol) of Epx-Tries was slowly added thereto. The mixture was left to stand for 24 hours under stirring at room temperature. The system at the end of the reaction showed pH 11.5.

(ii) After the reaction was over, the mass was treated in the same manner as in Synthesis No. 11 to obtain condensation product (silsesquioxane) C having a number average molecular weight of 1,500.

(2) Preparation of photocationically curable resin compositions

Condensation product B or C obtained in Synthesis No. 11 or 12, a reactive diluent represented by the following formula VII and bis(dodecylphenyl)iodonium hexafluoroantimonate as a cationic photopolymerization-initiator (2.5% by weight per the sum amount of the condensation product and the reactive diluent) were mixed together in the mixing ratios as shown in Table 3, to prepare photocationically curable resin compositions of Examples 2 through 6 and Comparative Examples 1 and 2. The compositions all in Examples 2 through 6 are clear, showing that the compatibilities of each component are good.

TABLE 3

| Mixing ratios | Condensation product (a) | | Photocationically polymerizable |
|---|---|---|---|
| (% by weight) | product B | product C | compound (b) |
| Comparative Example 1 | 0 | — | 100 |
| Example 2 | 10 | — | 90 |
| Example 3 | 30 | — | 70 |
| Example 4 | 50 | — | 50 |
| Example 5 | 70 | — | 30 |
| Example 6 | 100 | — | 0 |
| Comparative Example 2 | — | 50 | 50 |

(VII)

(3) Evaluation of the photocationically curable compositions

Photocationically curable resin compositions in Examples 2 through 6 and Comparative Examples 1 and 2 were tested in respect to items of curability, pencil hardness and elasticity. The results are shown in Table 4.

(i) Curability

Each composition was applied onto a glass substrate to an about 20 μm thickness with a bar coater. Irradiation was effected with UV under conditions as mentioned above. The times of irradiation until surface tucks disappeared were counted.

(ii) Pencil hardness

Each composition was applied onto a steel plate or glass substrate to about 20 μm thickness with a bar coater. Irradiation was effected with UV five times to obtain a cured film. Surface pencil hardness of the film was tested according to JIS K 5400.

(iii) Elasticity

The cured film obtained in above (ii) was peeled off from the substrate using a knife. Easiness to peel and feeling at that time wer organoleptically evaluated. The results are represented in the following three stages:

×; flexible and hardly peeled off

Δ; less flexible

○; peeled off with crunching sound

TABLE 4

| | Cur-ability | Pencil hardness (on steel plate) | | Pencil hardness (on glass plate) | | |
|---|---|---|---|---|---|---|
| | (times) | flawing | peeling | flawing | peeling | Elasticity |
| Comparative Example 1 | 6 | HB | 3H | HB | 3H | x |
| Example 2 | 7 | H | 4H | HB | 5H | x |
| Example 3 | 7 | 2H | 5H | H | 6H | x |
| Example 4 | 7 | 3H | 5H | 2H | 6H | x |
| Example 5 | 8 | 4H | 5H | 4H | 8H | Δ |
| Example 6 | 8 | 2H | 6H | 5H | >9H | ○ |
| Comparative Example 2 | 12 | 5H | 5H | H | 5H | x |

Table 4 shows that as mixing ratios of the condensation product are in Examples 2 through 6, hardness in terms of flawing and peeling-off of the cured films formed from the present compositions is larger, against the cured film formed from the composition in Comparative Example 1 which contains no condensation product. So is in Comparative Example 2, that is, a cured film of a high hardness is obtained. The cured films in Examples all in which reactive diluents are used together have adequate elasticities.

All of the compositions in Examples 2 through 6 show excellent photocuarabilities. The composition in Example 4 in which condensation product B containing an oxetanyl group is used, shows better photocurability than the composition in Comparative Example 2 in which condensation product C containing an epoxy group is used.

EXAMPLES 7 THROUGH 19

(1) Syntheses of condensation products having a silicone chain introduced

Synthesis No. 13

A photocationically polymerizable resin composition was obtained by hydrolyzing a mixture of Oxe-Tries and a reactive silicone represented by the formula VIII (referred to as "OH-Silicone", hereunder) as mentioned below. The OH-Silicone used was "DMS-S21" (a tradename; manufactured by Chisso Corporation) having a number average molecular weight of about 4,200.

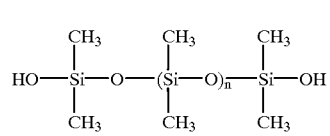
(VIII)

(i) Into a reactor provided with a stirrer and thermometer were fed 30 g of isopropyl alcohol, 2.73 g of an aqueous 10% Me$_4$NOH solution (H$_2$O: 136.5 mmol, Me$_4$NOH 3.0 mmol) and 0.78 g (43.3 mmol) of water. Then, a mixture of 19.23 g (60.0 mmol) of Oxe-Tries and 1.5 g (0.36 mmol) of OH-Silicone was slowly added thereto, and the reaction mass was left to stand under stirring at room temperatures. The reaction process was followed by gel permeation chromatography, and the reaction was over at the time when Oxe-Tries almost disappeared, i.e., about 20 hours after addition of the mixture. The reaction system at that time showed pH 11.5.

(ii) After the reaction was over, 100 ml of toluene was added thereto, and the solution was washed with an aqueous saturated sodium chloride solution in a fractionating funnel.

(iii) The washing was repeated until the aqueous layer in the funnel became neutral. The organic layer was fractionated and dehydrated over anhydrous sodium sulfate, and the toluene was evaporated in vacuo to obtain condensation product D having a silicone chain introduced, which was colorless and slightly turbid and had a number average molecular weight of about 2,000.

Resulting condensation product D having a silicone chain introduced was soluble in toluene, tetrahydrofuran, hexane, acetone and other conventional solvents, and turned to a colorless clear solution by addition of such a small amount of solvent that concentration of solid product D became, for example, not higher than 70% by weight. An assumption that, in product D, the silicone chain had been bound to the silsesquioxane compound was substantiated from the following test. That is, when the previously synthesized condensation product (a) having no silicone chain was mixed with OH-Silicone, they were not compatible from each other at all. So was even when they were in the form of a solution of 50% by weight solid concentration in an organic solvent. Supposedly, the reason why product D obtained in Synthesis No. 13 was colorless and slightly turbid when no organic solvent was contained would be that the condensation product was a mixture of silsesquioxanes of various structures to which a silicone chain had been introduced, and silsesquioxanes of various structures to which no silicone chain had been introduced, and that some of them were incompatible from each other. On the other hand, when OH-Silicone having a smaller number average molecular weight than that in Synthesis No. 13 was used, it was possible to obtain a condensation product in which compatibility of the compounds was better. For example, a condensation product obtained using OH-Silicone of a number average molecular weight of about 2,000, under the same procedure as in Synthesis No. 13, was colorless and clear, even when no organic solvent was contained.

Synthesis No. 14

A photocationically polymerizable resin composition was obtained by hydrolyzing a mixture of Oxe-Tries and a reactive silicone represented by the formula IX (referred to as "H-Silicone", hereunder), which had been prepared to have a number average molecular weight of 2,900 and a degree of distribution of 1.38.

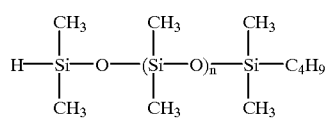
(IX)

The above hydrolysis was effected as mentioned below.

(i) Into a reactor provided with a stirrer and thermometer were fed 60 g of isopropyl alcohol, 5.46 g of an aqueous 10% Me$_4$NOH solution (H$_2$O: 273.0 mmol, Me$_4$NOH 6.0 mmol) and 1.56 g (87 mmol) of water. Then, a mixture of 38.46 g (120.0 mmol) of Oxe-Tries and 3.0 g (1.03 mmol) of H-Silicone was slowly added thereto. The reaction mass was left to stand under stirring at room temperatures. The process of the reaction was followed by gel permeation chromatography. The reaction was over at the time when the Oxe-Tries almost disappeared, i.e., about 20 hours after addition of the mixture. The reaction system at that time showed pH 11.5.

(ii) After the reaction was over, the reaction mass was treated in the same manneer as in Synthesis No. 13, to obtain condensation product E having a silicone chain introduced, which was colorless and slightly turbid and had a number average molecular weight of about 2,000. Product E was soluble in toluene, tetrahydrofuran, hexane, acetone, and other conventional solvents, as same as product D obtained in Synthesis No. 13.

(2) Preparation of photocationically curable resin compositions

To 100 parts by weight of condensation product D or E having a silicone chain introduced, obtained in Synthesis No. 13 or 14, respectively, was added 3 parts by weight of bis(dodecylphenyl)iodonium hexafluoroantimonate as a cationic phtopolymerization initiator. Further, 10 parts by weight of toluene was added thereto in order to decrease viscosity, to prepare the photocationically curable compositions of Examples 7 and 8, respectively.

Each of the condensation products D and E having a silicone chain introduced, obtained in Syntheses Nos. 13 and 14, was mixed with a reaction diluent, and then with bis(dodecylphenyl)iodonium hexafuoroantimonate as a cationic photopolymerization-initiator in an amount of 3% by weight per the sum amount of the condensation product having a silicone chain introduced and the reaction diluent. Mixing ratios are shown in Table 5. As the results, the photocationically curable resin compositions of Examples 9 through 19 were obtained. All of the compositions in Examples 7 through 19 were clear, showing that the components in the compositions being well compatible.

TABLE 5

| Mixing ratio | Condensation products having silicone chain introduced | | Reactive diluents | | | |
|---|---|---|---|---|---|---|
| (% by weight) | D | E | Oxe-Tries | Hexyl-Oxe | Allyl-Oxe | Epx-Tries |
| Example 7 | 100 | — | — | — | — | — |
| Example 8 | — | 100 | — | — | — | — |
| Example 9 | 77 | — | 23 | — | — | — |
| Example 10 | 50 | — | 50 | — | — | — |
| Example 11 | 23 | — | 77 | — | — | — |
| Example 12 | 77 | — | — | 23 | — | — |
| Example 13 | 77 | — | — | — | 23 | — |
| Example 14 | 77 | — | — | — | — | 23 |
| Example 15 | — | 77 | 23 | — | — | — |
| Example 16 | — | 50 | 50 | — | — | — |
| Example 17 | — | 77 | — | 23 | — | — |
| Example 18 | — | 77 | — | — | 23 | — |
| Example 19 | — | 77 | — | — | — | 23 |

Note:
Oxe-Tries: [3(triethoxysilyl)propyloxymethyl]oxetane
Hexyl-Oxe: 3-ethyl-3-(hexyloxymethyl)oxetane
Ally-Oxe: 3-ethyl-3-(allyloxymethyl)oxetane
Epx: γ-glycidoxypropyltriethoxysilane (3) Evaluation of the photocationically curable compositions The photocationically curable compositions in Examples 7 through 19 were tested with respect to items of curability, pencil hardness and pollution-free property. The results as shown in Table 6.

(i) Curability
The same as in Table 2.

(ii) Pencil hardness
The same as in Table 2.

(iii) Pollution-free property
Lines were drawn using a black oily Marker ("Hi-Mckee" made by ZEBRA Co.) on the surface of the cured film obtained as in (ii) above (after being left to stand for 24 hours), to evaluate an ink-repellency by eyes. The results are shown in the following 3 stages:

×: completely repellent (excellent pollution-free property)
Δ: some inks remaining (fairly good pollution-free property)
○: no repellency (inferior pollution-free property)

TABLE 6

| | Cur-ability | Pencil hardness (on steel plate) | | Pencil hardness (on glass plate) | | Pollution-free |
|---|---|---|---|---|---|---|
| | (times) | flawing | peeling | flowing | peeling | property |
| Example 7 | 7 | 5H | 5H | 7H | 7H | x |
| Example 8 | 7 | 5H | 5H | 6H | 7H | x |
| Example 9 | 6 | 4–5H | 5H | 6H | 7H | x |
| Example 10 | 6 | 4–5H | 5H | 5H | 7H | x |
| Example 11 | 5 | 4H | 4H | 5H | 6H | x |
| Example 12 | 6 | 4–5H | 5H | 5H | 7H | x |
| Example 13 | 6 | 4H | 4H | 4H | 6H | Δ |
| Example 14 | 8 | 4H | 4H | 4H | 5H | x |
| Example 15 | 6 | 4–5H | 5H | 5H | 7H | x |
| Example 16 | 6 | 4–5H | 5H | 5H | 7H | x |
| Example 17 | 7 | 4–5H | 5H | 5H | 7H | x |
| Example 18 | 6 | 4H | 5H | 4H | 6H | Δ |
| Example 19 | 8 | 4H | 4H | 4H | 6H | x |

All of the cured films formed from the compositions in Examples 7 through 19 which contain condensation products having a silicone chain introduced, show excellent or fairly good pollution-free properties. This owes to silicone characteristics given to these cured films. All of the cured films formed from the compositions in Examples 7 through 19 have excellent surface hardness, too. On the other hand, a condensation product having no silicone chain introduced gives inferior pollution-free property (○), because of the absence of silicone characteristics.

Even after wiping with a dry gauze was effected 1,000 times on the cured films formed from the compositions in Examples 7 through 19, under a 500 g load, the ink-repellency was still observed. Excellent pollution-free property maintained owes to the silicone chain left unremoved from the cured film even after the wiping, because the silicone chain has been linked to the condensation product in the present compositions.

Almost the same performances of the compositions and the cured films were observed, when a hydrolyzate obtained from hydrolysis under a neutral condition of Epx-Tries was used, in place of the Oxe-Tries.

The present invention is not restricted by the specific examples mentioned above, but various examples can be made according to the objects and usages within the scope of the invention.

The photocationically curable compositions according to the present invention are excellent in their photocationic polymerizabilities, as compared with epoxide-type monomers, because they contain a condensation product having an oxetanyl group which gives a high photocationic polymerization rate. They can be easily handled, as compared with silica, because of the solubility in various organic solvents. They can produce photocationically cured products of high hardness with excellent processability and formability in making coating films. Accordingly, they are useful, for example, as hard coating agents.

The photocationically curable compositions having partially a silicone chain introduced are free from the problems in compatibility, unlike a mere mixture of a silicone and a silsesquioxane compound having no silicone chain, and can give the silicone characteristics to the cured products. Thus, the present compositions are also useful, for example, as pollution-free paints and scribbling-proofing coating material, owing to such features, together with the characteristics in the ability of forming cured products of high surface hardness.

When the present composition is mixed with reactive diluents, the physical properties of the cured product can freely be adjusted. Accordingly, for examples, a cured product with balanced surface hardness and elasticity is obtained.

The present process provides photocationically curable compositions comprising a condensation product having an oxetanyl group, as mentioned above.

What is claimed is:

1. A photocationically curable composition which comprises:
    a) a siloxane compound having an oxetanyl group, which is a product of hydrolysis and condensation of an organic silane compound having an oxetanyl group and being represented by the formula I:

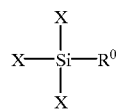

(I)

wherein $R^0$ means an organic functional group having an oxetanyl group, X means a hydrolyzable group and greater than 90% of the hydrolyzable groups have reacted to form a siloxane linkage; and
    b) a photoinitiator.

2. A photocationically curable composition according to claim 1 wherein substantially all of the hydrolyzable groups have reacted to form a siloxane linkage.

3. The photocationically curable composition according to claim 1, in which the $R^0$ is an organic functional group represented by the formula IV:

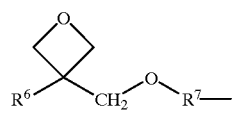

(IV)

wherein $R^6$ means a hydrogen atom or an alkyl group having 1 to 6 carbon atoms; and $R^7$ means an alkylene group having 2 to 6 carbon atoms.

4. The photocationically curable composition according to claim 1, in which X in the formula (I) is an alkoxy, cycloalkoxy or aryloxy group.

5. A process for producing photocationically curable compositions, which comprises hydrolyzing and condensing an organic silane compound having an oxetanyl group and being represented by the formula I as shown below, with or without a reactive silicone having a siloxane linkage-forming group, under a pH condition of not less than 7:

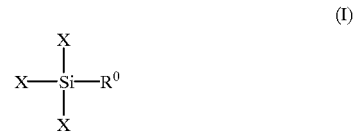

(I)

wherein $R^0$ means an organic functional group having an oxetanyl group, and X means a hydrolyzable group.

6. A process according to claim 5, wherein said hydrolysis and condensation is conducted under a pH condition of 9 to 13.

7. A photocationically curable composition according to claim 1 wherein said siloxane compound is a product of hydrolysis and condensation of said organic silane compound with a reactive silicone having a siloxane linkage-forming group.

8. A process according to claim 7 wherein substantially all of the hydrolyzable groups have reacted to form a siloxane linkage.

9. The photocationically curable composition according to claim 7, in which the reactive silicone is a compound represented by the formula II or III:

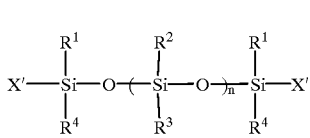

(II)

wherein X' means a siloxane linkage-forming group; $R^1$ and $R^4$ mean, respectively, a substituted group selected from alkoxy, cycloalkoxy, aryloxy, alkyl, cycloalkyl, and aryl groups; $R^2$ and $R^3$ mean, respectively, an alkyl, cycloalkyl, or aryl group; and n is positive number of 1 to 10,000; and

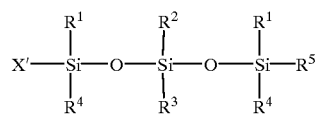

(III)

wherein X', $R^2$, $R^3$, $R^4$ and n are the same as defined above, and $R^5$ means an alkyl, cycloalkyl, or aryl group.

* * * * *